UNITED STATES PATENT OFFICE.

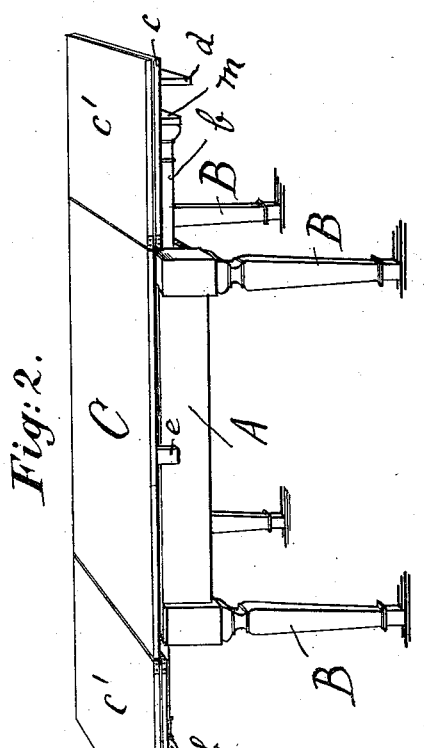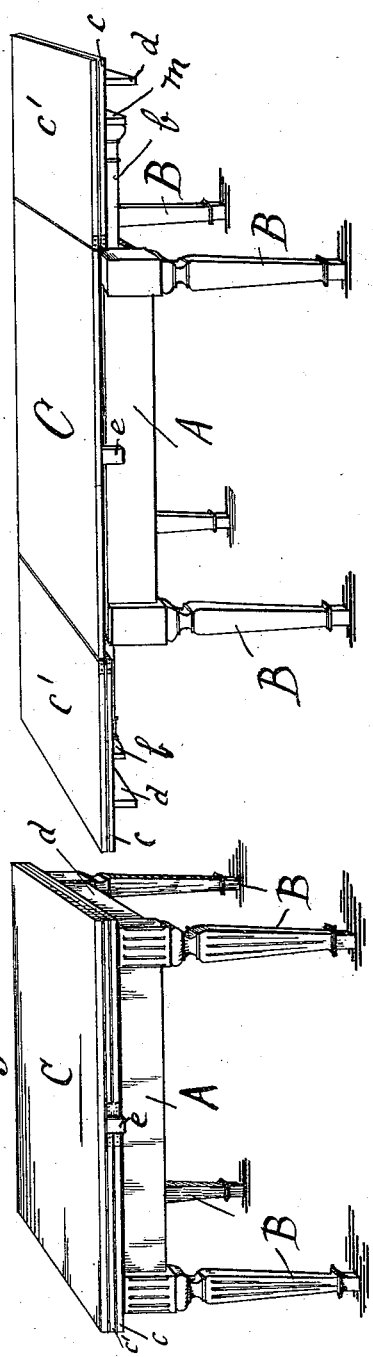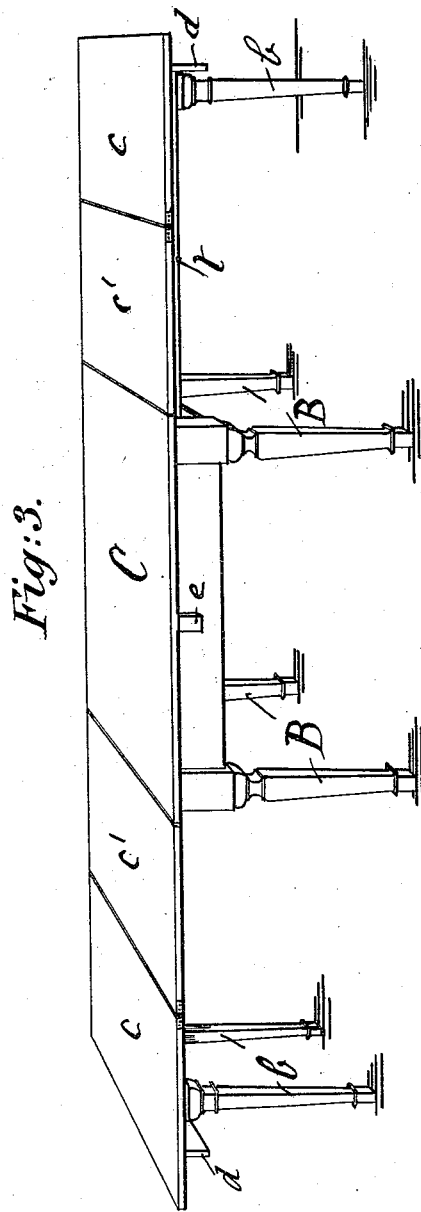

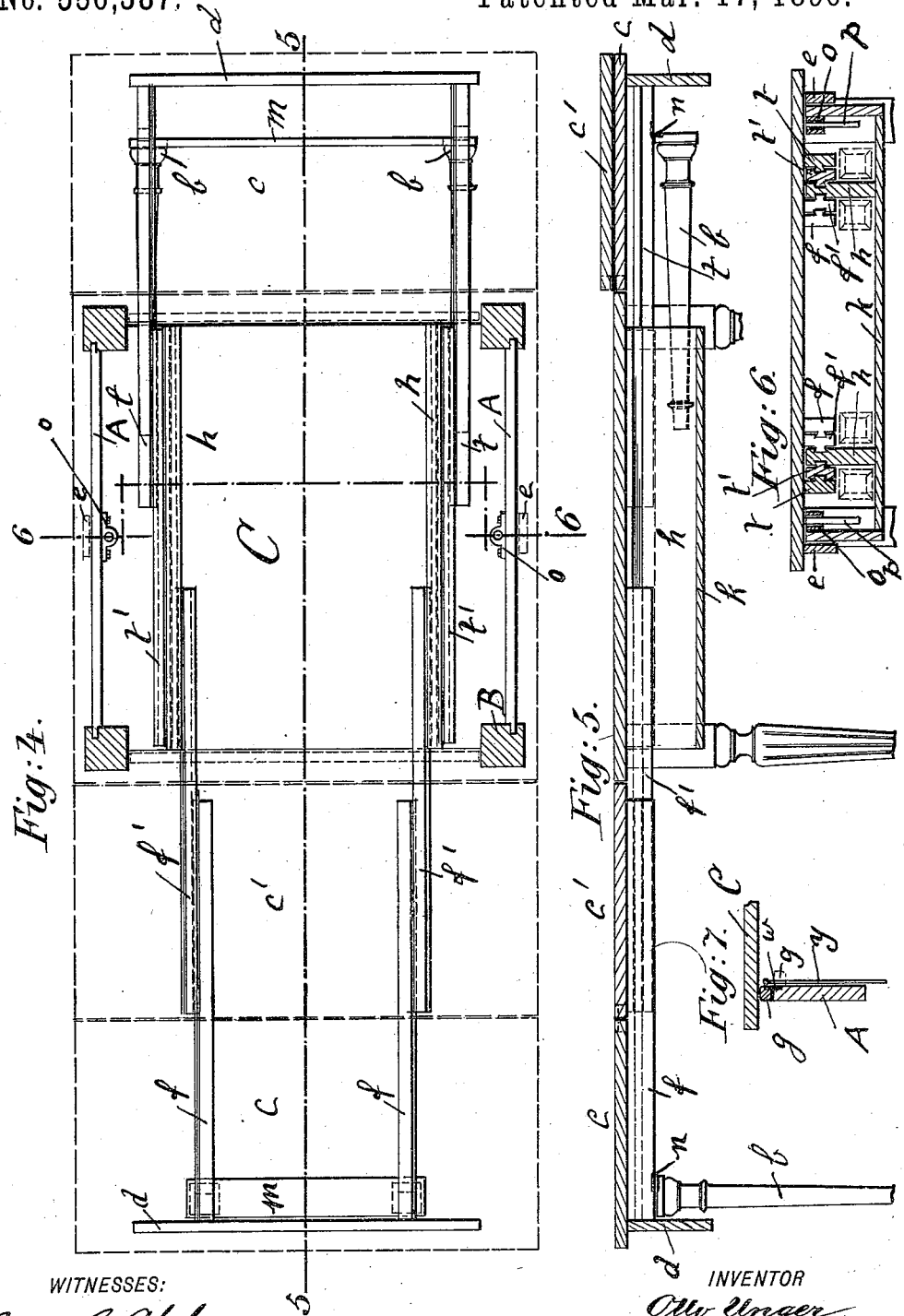

OTTO UNGER, OF NEW YORK, N. Y.

COMBINED FOLDING AND EXTENSION TABLE.

SPECIFICATION forming part of Letters Patent No. 556,387, dated March 17, 1896.

Application filed January 29, 1895. Serial No. 536,613. (No model.)

*To all whom it may concern:*

Be it known that I, OTTO UNGER, a subject of the German Emperor, residing in the city, county, and State of New York, have invented certain new and useful Improvements in Extension-Tables, of which the following is a true specification.

This invention relates to improvements in extension-tables, and has for its object to provide a combined folding and extension table which shall be capable of easy adjustment and which is constructed without complicated parts, rendering the whole table simple in manipulation and inexpensive in manufacture.

In the accompanying drawings, Figure 1 is a perspective view of the improved extension-table with extension-leaves folded in. Fig. 2 is a perspective view of same with extension-leaves partially drawn out. Fig. 3 is a perspective view of same with leaves fully drawn out and hinged legs down, supporting said extension-leaves. Fig. 4 is a view from below, showing one side fully extended and the other side only partially so, the main frame being shown partly in section. Fig. 5 is a longitudinal section on line 5 5, Fig. 4. Fig. 6 is a cross-section on line 6 6, Fig. 4, and Fig. 7 is a detail.

Similar letters refer to like parts throughout the several figures.

The main frame of the table consists of the side pieces, A, legs B B, and base $k$, all of which are rigidly fastened together. The middle or top leaf, C, is provided with flat guide-pieces $e$ and guide-rods $p$, which latter slide in eyes $o\ o$, attached to the inner sides of the side pieces, A. The middle or top leaf, C, can thus move vertically without being shifted from its place, Fig. 6.

The extensions consist of leaves $c\ c\ c'\ c'$, hinged and folded together, the hinges being turned toward the table when said leaves are folded together, Figs. 1 and 2. The leaves $c\ c$, which, when the table is fully extended, will be the outer leaves, are rigidly attached to the extension-slides $f\ f$, which are the innermost slides, and to the slides $t\ t$, which are the outermost slides, Figs. 4, 5, and 6. These slides are provided with lateral dovetail projections which fit in corresponding lateral grooves in the slides $f'\ f'$ and $t'\ t'$, and these latter slides are again provided with lateral dovetail projections which fit in grooves in the stationary guide-boards $h\ h$, Figs. 4, 5, and 6. The boards $h\ h$ are rigidly attached to the base $k$ and extend the length of the main frame. The leaves $c'\ c'$ being hinged to and made to fold over onto leaves $c\ c$ are not attached to the slides. When the slides are fully drawn out by means of the rail-boards $d\ d$, the leaves $c'\ c'$ are turned over toward the middle leaf, C, which has sunk the depth of the folded leaves, and the whole upper surface of the table is level. (See Figs. 3 and 6.)

For the support of the extensions, legs $b\ b$ are attached in pairs to cross-bars $m\ m$, which are hinged at $n\ n$ to the slides $f\ f$ and $t\ t$. When the table is in an unextended state, the legs $b\ b$ are turned up and hidden from view in the main frame of the table, being prevented from falling by the base $k$. The end rails $d\ d$ serve to pull the extensions and slides out, and when the table is unextended they form the ends of the main frame and appear integral with the same.

To enable the table to be used in the state shown in Fig. 1—that is, only partially extended—I employ the device shown in Fig. 7 to hold the leaf C up to a level with the folded leaves $c'\ c'$. This device consists of bars $g$, made the thickness of a leaf and hinged at $w$ to the top inner sides of the side pieces, A. To these bars are attached rods $y$ with ball-and-socket joints, by means of which the bars $g$ can be raised onto the top of the side pieces, A, or lowered, as desired. When the table is fully extended these bars are lowered, being only required when the table is used, as shown in Fig. 2; but I do not desire to limit myself to this means of retaining the leaf C in the desired position.

The manipulation of the table is as follows: To open the same, the end rails are drawn out, and with them the slides and leaves. When the leaves are fully drawn out from under the center leaf, C, this latter will sink vertically. On still further drawing out the slides the legs $b\ b$ will become free and fall. It is then only necessary to turn back the leaves $c'\ c'$, and the table is complete. In closing the table, leaves $c'\ c'$ are first folded back and then the legs turned up. The slides are pushed in and telescope together, care being taken that the legs pass into the body of the main frame. Leaf C is then lifted up slightly and the extension-leaves slipped under, and the whole table is again in a complete but unextended condition.

The table, as above described, is absolutely free from complicated parts, and cannot consequently come out of order, is therefore easy of manipulation, and inexpensive in manufacture.

Having now fully described my invention, I declare that what I claim as new, and desire to secure by Letters Patent, is—

1. In an extension-table, the combination with a main frame and top leaf, hinged leaves capable of being folded together and capable of being made level with the center or top leaf when extended, the lowermost of the said hinged leaves being attached to telescopic slides to which legs are hinged for the purpose of support, and end rails attached to the ends of the outermost slides which form the ends of the main frame when the table is unextended, substantially as set forth.

2. In an extension-table, the combination with a main frame and top leaf, hinged leaves capable of being folded together and capable of being made level with the center or top leaf when extended, the lowermost of the said hinged leaves being attached to telescopic slides to which legs are hinged for the purpose of support, end rails attached to the ends of the outermost slides which form the ends of the main frame when the table is unextended, and means for holding the center leaf in a raised position, substantially as set forth.

In testimony that I claim the foregoing as my invention I have signed my name, in presence of two witnesses, this 28th day of January, 1895.

OTTO UNGER.

Witnesses:
JUAN C. ABEL,
VICTOR J. REINKING.